US011379290B2

(12) United States Patent
Patel et al.

(10) Patent No.: US 11,379,290 B2
(45) Date of Patent: Jul. 5, 2022

(54) PRIORITIZING AND PARALLELIZING THE CAPTURE OF DATA FOR DEBUGGING COMPUTER PROGRAMS (71) Applicant: International Business Machines Corporation, Armonk, NY (US)

(72) Inventors: Purvi Sharadchandra Patel, Rock Hill, SC (US); Scott B. Compton, Hyde Park, NY (US); Girija Varanasi, Poughkeepsie, NY (US); Ralph Sharpe, Newburgh, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 517 days.

(21) Appl. No.: 16/513,935

(22) Filed: Jul. 17, 2019

(65) Prior Publication Data

US 2021/0019219 A1 Jan. 21, 2021

(51) Int. Cl.
*G06F 11/07* (2006.01)
*G06F 11/36* (2006.01)
*G06F 9/50* (2006.01)
*G06F 9/38* (2018.01)

(52) U.S. Cl.
CPC ........ *G06F 11/0781* (2013.01); *G06F 9/3822* (2013.01); *G06F 9/5038* (2013.01); *G06F 11/362* (2013.01)

(58) Field of Classification Search
CPC ... G06F 11/0781; G06F 9/3822; G06F 9/5038
USPC .......................................... 714/25, 48, 38.11
See application file for complete search history.

(56) References Cited

U.S. PATENT DOCUMENTS

| 5,884,019 | A | 3/1999 | Inaho |
| 6,643,802 | B1 | 11/2003 | Frost et al. |
| 8,812,443 | B2 | 8/2014 | Dewey et al. |
| 9,996,427 | B2 | 6/2018 | Rathod et al. |

(Continued)

FOREIGN PATENT DOCUMENTS

EP 0309428 A 3/1989

OTHER PUBLICATIONS

Yijian Huang et al. "Optimizing crash dump in virtualized environments," Proceedings of the 6th ACM SIGPLAN/SIGOPS international conference on Virtual execution environments (VEE '10). ACM, New York, NY, USA, pp. 25-36. Mar. 17, 2010.

*Primary Examiner* — Chae M Ko
(74) *Attorney, Agent, or Firm* — Cantor Colburn LLP; Teddi Maranzano (57) ABSTRACT

Aspects of the invention include receiving a request to obtain data located in an address space to diagnose a computer error. It is determined whether a threshold number of resources are available to obtain the data. Based on determining that the threshold number of resources is available to obtain the data, a priority level of the computer program is assessed. A number of threads to assign to a workload to obtain the data from the address space is determined based at least in part on the priority level of the computer program. The determined number of threads are assigned to the workload. The workload is divided into a number of parallel units equal to the number of threads assigned to the workload. The parallel units of the workload are executed by the assigned threads to capture the data in the address space. The captured data is stored.

17 Claims, 6 Drawing Sheets (56) References Cited

U.S. PATENT DOCUMENTS

| | | | |
|---|---|---|---|
| 2014/0372712 A1* | 12/2014 | Chamberlain | G06F 13/1626 |
| | | | 711/151 |
| 2015/0355996 A1* | 12/2015 | Smith | G06F 9/461 |
| | | | 717/128 |
| 2017/0242743 A1* | 8/2017 | Miller | G06F 11/0709 |
| 2019/0258631 A1* | 8/2019 | Pal | G06F 16/24535 |
| 2019/0272271 A1* | 9/2019 | Bhattacharjee | G06F 16/24554 |
| 2019/0310977 A1* | 10/2019 | Pal | G06F 16/2455 |

* cited by examiner

PRIORITIZING AND PARALLELIZING THE CAPTURE OF DATA FOR DEBUGGING COMPUTER PROGRAMS

BACKGROUND

The present invention generally relates to debugging software, and more specifically, to prioritizing and parallelizing the capture of data for debugging computer programs such as software applications.

A software application may be made up of a plurality of modules, environments, executable files, and dynamically linked libraries that execute within one or more address spaces. A software application can drive a number of end-user programs to perform a group of coordinated functions, tasks, and/or activities for the benefit of the users of a computing system. A software application may also access data from various sources and other computing systems (e.g., storage systems). During the development, testing, and deployment of a software application, users of a software application may encounter various problems and inconsistencies during the execution of the software application. Some problems are internal to the software application. Other problems experienced by the software application can be related to interactions with other software and/or system issues. Various memory dumps and system logs can be supplied to the developers of the software application to debug the software application.

SUMMARY

Embodiments of the present invention provide prioritized and parallel data capture for memory dumps. A non-limiting example computer-implemented method includes receiving a request to obtain data to diagnose a computer error. The data is located in an address space assigned to a computer program. A size of the data is estimated. It is determined whether a threshold number of resources are available to obtain the data, where the threshold number is based at least in part on the estimated size of the data. Based on determining that the threshold number of resources is available to obtain the data, a priority level of the computer program is assessed. A number of threads to assign to a workload to obtain the data from the address space is determined based at least in part on the priority level of the computer program. The determined number of threads are assigned to the workload. The workload is divided into a number of parallel units equal to the number of threads assigned to the workload. The parallel units of the workload are executed by the assigned threads to capture the data in the address space. The captured data is stored.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention take advantage of parallelism during the capture of data for diagnosing computer program errors. This process of capturing diagnostic data is often referred to as "a memory dump process." The output of the memory dump process is referred to as a "memory dump" because all of the contents of the memory corresponding to selected address spaces are captured and saved for analysis. When compared to contemporary memory dump processes that use a single thread for each of the selected address spaces, one or more embodiments of the present invention can perform the data capture in a single address space using two or more threads operating in parallel which results in faster data capture times, and thus, improved application availability. In accordance with one or more embodiments of the present invention, instructions to prioritize and parallelize the data capture for generating memory dumps are built into the component of an operating system (OS) that is responsible for executing the memory dump process. Hence, there is no burden of additional setup on personnel (e.g., a system programmer or system administrator).

With the introduction of 64-bit architectures in OSs such as z/OS® from IBM and Windows® 7 from Microsoft, the volume of storage has increased far beyond the previous limits that were typically two gigabytes (GB) for an application due to address space limitations. As used herein, the term address space refers to the virtual storage addressing range available to an online user or a running program. In contemporary systems, individual applications can each create and access in excess of two GBs of storage and aggregating multiple applications can result in the utilization of vast volumes of storage. However, the greater the volume of the data used by an application, the more storage space that is required to save debug data, or memory dumps, that is captured to diagnose a detected computer error (e.g., an application or other computer program error). In addition, the greater the volume of the data in the memory dumps, the longer it takes to capture, move (e.g., send), and analyze the data in order to determine the root cause of an identified computer error.

To gather a reasonably static picture at the time of a detected failure, a component of an OS, such as a diagnostic data program that is responsible for executing the capture of data for debugging software applications, halts operations in all non-exempt address spaces that have been selected for inclusion in the memory dump. As used herein, the term "non-exempt address space" refers to those system address spaces that prefer not to halt their activities while their data is being captured. The diagnostic data program causes the operations to halt by setting all tasks in each address space selected for inclusion in the memory dump to a state of "non-dispatchable" (i.e., the tasks are prevented from being dispatched) while capturing the requested debug data (e.g., global data and local data). As used herein, the term "global data" refers to data in common storage, which is shared by and accessible from all address spaces and the term "local data" refers to data in private storage of an address space, which is not shared with other address spaces. The tasks in the address spaces are reset to a state of dispatchable (i.e., the tasks can be dispatched) after the local data for the address space has been captured.

In contemporary diagnostic data programs, the data capture is initiated in parallel to all address spaces that are to be included in the memory dump however, the capture of the data occurs serially within each address space using one process, or thread. As applications continue to exploit more storage, more data will need to be captured by the diagnostic data programs, which will not only increase the amount of debug data, but also elongate the debug data capture times, which will result in keeping tasks non-dispatchable for longer periods of time. The elongated debug capture times impacts application availability as well as a first failure data capture (FFDC) for subsequent errors as only one memory dump per address space can be captured at a time. One or more embodiments of the present invention reduce the memory dump capture times in non-resource constrained systems by allowing multiple threads to be capturing the data in parallel within a single address space.

In contemporary systems, the captured data is stored in a 2 GB dataspace, or address space, and the diagnostic data program of the OS can use at most one-hundred dataspaces, limiting the total debug data, or memory dump, size to a maximum of two-hundred GBs for the entire system. This size constraint can become an issue as the amount of storage an address space can exploit in the 64-bit arena is growing and will continue to grow, increasing the size of the memory dumps. One or more embodiments of the present invention eliminate the two-hundred GB limit on the memory dump size by storing the captured data in the dumping address space's vast 64-bit private memory, divided into separate sections to avoid collisions among parallel workers.

One or more embodiments of the present invention improve the performance of the data capture for debugging software applications in a non-resource constrained system by implementing local data capture of applications and their address spaces using multiple processes, or threads, operating in parallel in a single address space to capture the debug data. When enough system resources (memory, CPUs, etc.) are available, the diagnostic data program can take several factors into account when determining how much (if any) parallelism to use while gathering the requested data. This reduces the diagnostic data capture time, and, hence, its impact on the system.

In contemporary systems, the diagnostic data program of the OS starts capturing the requested data serially (i.e., using a single thread, or process) in each address space selected for inclusion in the memory dump. In accordance with one or more embodiments of the present invention, the processing performed by contemporary systems is updated to utilize parallelism. One or more embodiments do not use a one-size-fits-all approach, but instead intelligently determine if it is possible and/or advantageous to use parallelism to capture the debug data. An example of a factor that can be taken into account in deciding how much parallelism to introduce is a priority level, or criticality of the application, or workload, executing in the address space.

Figure 1:
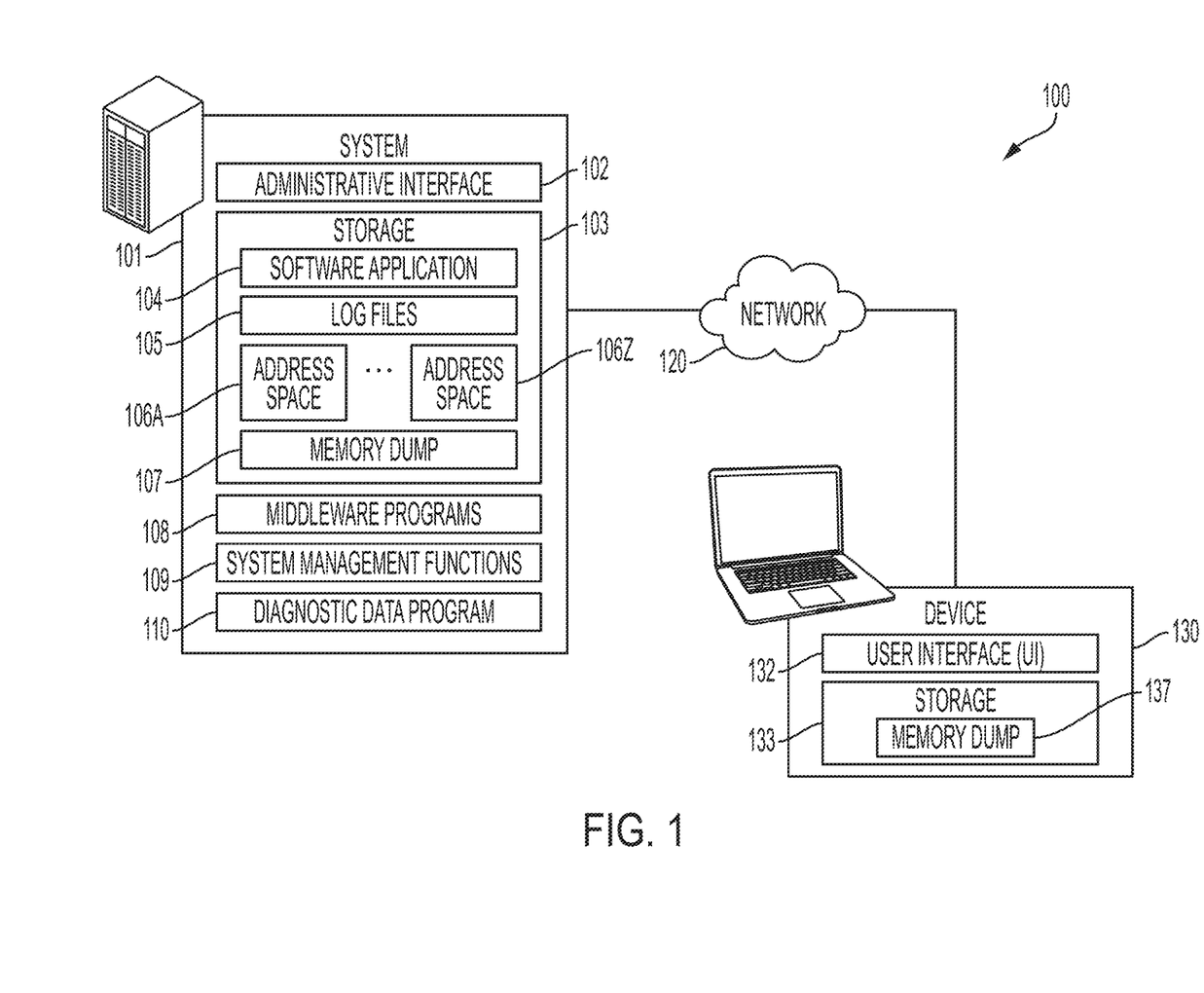
FIG. 1 depicts a computing environment in accordance with one or more embodiments of the present invention.

Turning now to FIG. 1, a functional block diagram of a computing environment 100 is generally shown in accordance with one or more embodiments of the present invention. In the embodiment shown in FIG. 1, the computing environment 100 includes a system 101 and a device 130 interconnected over a network 120. In one or more embodiments, the computing environment 100 is representative of a virtualized computing environment, such as within a mainframe computer (e.g., a "big-iron" system). In one or more other embodiments, the computing environment 100 is representative of a networked computing environment. In various embodiments, computing environment 100 is representative of a combination of architectures supporting a plurality of instances of system 101, such as within a data center. Many modifications to the depicted environment may be made by those skilled in the art without departing from the scope of embodiments of the present invention.

System 101 and device 130 may be implemented by, but are not limited to: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), and/or any programmable computer systems known in the art. In certain embodiments, system 101 and device 130 represent computer systems utilizing clustered computers and components (e.g., database server computers, application server computers, etc.) that act as a single pool of seamless resources when accessed through network 120, as is common in data centers and associated with cloud-computing applications.

In general, system 101 and device 130 are representative of any programmable electronic device or combination of programmable electronic devices capable of executing machine-readable program instructions and communicating with users of system 101 and device 130, via network 120. System 101 and device 130 may include components, as depicted and described in further detail with respect to FIG. 6, in accordance with embodiments of the present invention.

In various embodiments, system 101 is representative of a virtualized computing system that can include a plurality of physical, virtualized, and/or para-virtualized computing entities; and can be configured to produce various execution environments. In one embodiment, system 101 is representative of a single LPAR to host a software application. In another embodiment, system 101 is representative of a plurality of LPARs to host various aspects of a software application. In some embodiments, system 101 is representative of a large computing system (e.g., a computing node) or group of computing systems configured to support an enterprise software application or to host a software application for a plurality of customers.

As shown in FIG. 1, system 101 includes: administrative interface 102, storage 103, middleware programs 108, system management functions 109, and diagnostic data program 110. In some embodiments, system 101 accesses one or more computing programs and/or databases that are network accessible and are utilized by one or more embodiments of the present invention and/or during the execution of software application 104. For example, system 101 may have a license to access a virtual engineering program and/or one or more analytics programs as a service via a cloud service provider.

Administrative interface 102 is representative of one or more control consoles associated with system 101 that include input and display capabilities. In one or more embodiments, administrative interface 102 provides command line input and control of system 101. In another embodiment, administrative interface 102 may be a graphical user interface (GUI) or a web user interface (WUI), and administrative interface 102 can display text, documents, forms, web browser windows, user options, application interfaces, and instructions for operation, and include the information, such as graphic, text, and sound that a program presents to an administrator of system 101. Administrative interface 102 may include a plurality of windows for viewing and/or inputting information to system 101. For example, administrative interface 102 may include a plurality of dashboards depicting the operations and key performance indicators of system 101 and sending messages to and receiving messages from users of system 101.

In addition, administrative interface 102 controls sequences/actions that an administrator of system 101 utilizes to input requests for data to diagnostic data program 110. In various embodiments, administrative interface 102 displays one or more icons representing applications that a user can execute via network 120, such as diagnostic data program 110 and various programs (not shown) of system 101 and/or other computing systems accessible via network 120. In addition, administrative interface 102 can control sequences of actions that the user utilizes to respond and/or confirms actions associated with diagnostic data program 110 and/or system management functions 109.

In some embodiments, an administrator of system 101 can interact with administrative interface 102 via a singular device, such as a touch screen (e.g., display), that performs both input to a GUI/WUI, and as an output device (e.g., a display) presenting a plurality of icons associated with apps and/or images depicting one or more executing software applications. In other embodiments, one or more aspects of system management functions 109 can generate administrative interface 102 operating within system 101. Administrative interface 102 may accept input from a plurality of input/output (I/O) devices (not shown) including, but not limited to, a tactile sensor interface (e.g., a touch screen, a touchpad) or a natural user interface (e.g., voice control unit, motion capture device, eye tracking, cyber glove, head-up display etc.). In addition to the audio and visual interactions, administrative interface 102 may receive input in response to an administrator of system 101 utilizing natural language, such as written words or spoken words, that system 101 identifies as information and/or commands.

As shown in FIG. 1, storage 103 includes software application 104, log files 105, address spaces 106A thru 106Z (referred to herein collectively as address spaces 106), and memory dump 107. In one embodiment, storage 103 includes volatile memory, such as random-access memory (RAM) and non-volatile memory (e.g., storage-class memory, persistent storage, etc.), such as flash memory, solid-state drives, hard-disk drives, and magnetic tapes. In one or more embodiments, the resources of storage 103 change in response to the execution environment of system 101. In one example, if system 101 is representative of an LPAR, then storage 103 is provisioned by a hypervisor (not shown) and may include virtualized storage entities. In another example, if system 101 is representative of a computing node, then storage 103 may be comprised of physical storage entities.

Storage 103 can include various programs and data. In one embodiment, storage 103 may also include various programs and/or databases, such as but not limited to: a hypervisor, one or more OSs (e.g., a host OS, various guest OSs), a file management program, a database management system, communication protocols (not shown), etc. utilized by system 101. Storage 103 can also include various services, functions, and application programming interfaces (APIs) utilized by software applications that execute on system 101. In various embodiments, storage 103 includes the data, source code, libraries, and binary files utilized by software application 104; data utilized by diagnostic data program 110, such as a catalog of active memory spaces and associated process identifiers (PIDs); and/or data within requests to capture debug data. In one scenario, storage 103 includes an in-progress summary report (not shown) for a received request to perform a memory dump process. Upon completion of a request to capture debug data, or memory dump data, the summary log is removed from general storage within storage 103 and included in memory dump 107. In some scenarios, a copy of a summary report for a request to dump data is included in a historical log of dump requests within log files 105.

Software application 104 can include one or more versions of a software application. In one embodiment, software application 104 is comprised of a plurality of executable and/or interpretable files. When executing, the software application 104 is assigned to one or more of the address spaces 106. Software application 104 may also include modules, libraries, and binary files. In some embodiments, software application 104 is an enterprise application that includes and/or interfaces with a plurality of other software applications. In an example, an e-commerce software application may utilize a web server, a domain name server (DNS), a database program, an e-mail program, a transaction-processing program, and a security program (e.g., a firewall, an authentication program, etc.). In various embodiments, during the execution of software application 104, software application 104 calls one or more APIs, services, or middleware programs installed on system 101.

Log files 105 can include various logs associated with the operations of system 101, and one or more functions (not shown) monitoring system 101 and/or monitoring the execution of one or more applications hosted on system 101. Examples of files included within log files 105 include, but are not limited to, error logs, message logs, system logs, event logs, transaction logs, and process traces. In some embodiments, one or more files within log files 105 are based on encoded data that is not readable by humans without parsing, conversion, and/or interpretation (e.g., post-processing). In addition, some data of log files 105 is structured as records in volatile memory. In various embodiments, the data within log files 105 is stored to persistent storage within storage 103 as files. As records, data within one file of log files 105 can be related to other data within another file of log files 105. In an embodiment, log files 105 include a dump summary log (not shown). The dump summary log includes a plurality of dump summary reports for historical requests to dump data to diagnose software applications and/or system 101. Diagnostic data program 110 can generate dump summary reports.

Address spaces 106 are areas of physical and/or virtualized memory of system 101 that are utilized by a plurality of service and processes, such as software application 104 and middleware programs 108. Address spaces 106 include the set of memory addresses that are accessible to a process, such as a software application. In some embodiments, an instance of address space 106 is allocated from volatile memory of storage 103 in response to a service or program initiating. If a service is utilized by one or more users, other software applications, or other services, then the instance of address space 106 persists. However, some processes and programs can dynamically establish and revoke access to another process and temporarily link (e.g., share) address spaces. Therefore, some shared address (e.g., cross-memory) spaces may not be identified based on the timing (e.g., execution sequence) and interactions between processes. In some scenarios, an instance of address space 106 remains allocated but not accessed (e.g., linked). In other scenarios, if the process within the instance of address space 106 is terminated in response to revoking the link to the process, then the memory of the instance of address space 106 is released to the pool of memory of system 101 (e.g., a portion of storage 103).

Memory dump 107 is a snapshot of the data in memory at a point in time when a request for a memory dump process is initiated. Memory dump 107 may include user data, portions of the OS, in process data, and code (e.g., compiled code, binary code, interpretable code, etc.) of an executing service, function, or program. In some embodiments, memory dump 107 is encoded data that is not readable by humans without post processing. In addition, some of memory dump 107 is structured as records. In one embodiment, memory dump 107 includes data associated with diagnosing the execution of software application 104. In another embodiment, memory dump 107 includes data associated with diagnosing the execution and/or operations of one or more aspects of system 101, such as the operations of one or more programs of middleware programs 108, or one or more services utilized by users of system 101. In various embodiments, memory dump 107 includes data associated with the hardware of system 101.

Middleware programs 108 can include one or more programs, services, and/or protocols that connect software components and/or enterprise applications. Some middleware programs 108 utilize APIs to interface with software applications and/or components. Middleware programs 108 are included in the infrastructure, which facilitates creation of business applications; provides core services, such as concurrency, transactions, threading, and messaging; and provides a software communication architecture for service-oriented architecture applications. Middleware programs 108 enable communication and management of data within distributed software applications. Middleware programs 108 may include Web servers, application servers, content management systems, and a customer information control system (CICS®). Other middleware services are associated with clustering, security, logging, and monitoring.

System management functions 109 can include a plurality of services, functions, tasks, and programs utilized to monitor, administer, and utilize system 101. System management functions 109 can include, but is not limited to, services, functions, tasks, and programs that manage software execution (e.g., workloads), access log files, control resource allocations, trace executing processes, assist configuring servers, managing access and security policies. System management functions 109 can also include services, functions, tasks, and programs for cataloging memory spaces, identifying cross-memory relationships, and performing memory dumps of memory spaces. In some embodiments, an administrator of system 101 utilizes various windows associated with administrative interface 102 to access one or more services, functions, tasks, or programs of system management functions 109. In various embodiments, a service, a function, a task, or a program of system management functions 109 generates another window, such as a dashboard within a portion of administrative interface 102.

Diagnostic data program 110 is a program that determines address spaces related to a request to obtain data by utilizing a memory dump function, service, or program. In an embodiment, diagnostic data program 110 identifies addresses spaces allocated within a computing system by address space identifiers (ASIDs). Diagnostic data program 110 can determine shared address spaces and corresponding ASIDs (e.g., references) based on cross-memory relationships and/or by relationship among programs, services, and middleware executing within a computing system. Diagnostic data program 110 can initiate dumps of the determined address spaces to obtain user-level data, system-level data, or a combination thereof. In an embodiment, diagnostic data program 110 is utilized to obtain data to diagnose issues (e.g., non-fatal behaviors and abnormality) that occur during the execution of a software application. In another embodiment, diagnostic data program 110 is utilized to obtain data to diagnose issues and degradations of performance that occur during the operations of a computing system.

In one or more embodiments, diagnostic data program 110 aggregates and filters the determined ASIDs of address spaces associated with a received request to dump data. In addition, diagnostic data program 110 can generate a summary report of the processes (e.g., the PIDs), ASIDs of address spaces, and data from various log files that are included in the memory dump associated with a received request to dump data.

In one embodiment, system 101 communicates through network 120 to device 130. In some embodiments, system 101 communicates with one or more other computing systems and/or computing resources (not shown), such as a web server, an e-mail server, a storage area network (SAN), etc. via network 120. Network 120 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 120 can be any combination of connections and protocols that will support communications between system 101 and device 130, in accordance with embodiments of the present invention. In various embodiments, network 120 operates locally via wired, wireless, or optical connections and can be any combination of connections and protocols such as, but not limited to a personal area network (PAN), near field communication (NFC), laser, infrared, and/or ultrasonic.

As shown in FIG. 1, device 130 includes user interface (UI) 132 and storage 133. Storage 133 can include various programs and data (not shown) and memory dump 137 (also referred to herein as "diagnostic data"). Examples of programs and data that device 130 may include are: an OS, a web browser, an integrated development environment (IDE), one or more versions of software application 104 (e.g., source code, compiled code, etc.), a communication program, a data decompression program, and certificates and security information to access system 101. Memory dump 137 is representative of an instance of memory dump 107 that is transferred to device 130 for storing, off-line analysis, and debugging of software application 104.

In one or more embodiments, UI 132 may be a GUI or a WUI, and UI 132 can display text, documents, forms, web browser windows, user options, application interfaces, and instructions for operation, and include the information, such as graphic, text, and sound that a program presents to a user. UI 132 enables a user (e.g., a software developer) of device 130 to communicate with system 101 via network 120. UI 132 can initiate the execution of an instance of software application 104 and in response view the results of user interactions with software application 104, such as submitting a request to check inventory and receiving the results of the inventory check. In addition, a user of device 130 can use UI 132 to communicate, with an administrator of system 101, a request to obtain a dump of data.

In some embodiments, a user of device 130 can interact with UI 132 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 132 operating within the GUI environment of device 130. UI 132 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyber glove, head-up display etc.). In addition to the audio and visual interactions, UI 132 may receive input in response to a user of device 130 utilizing natural language, such as written words or spoken words, that device 130 identifies as information and/or commands.

Figure 2:
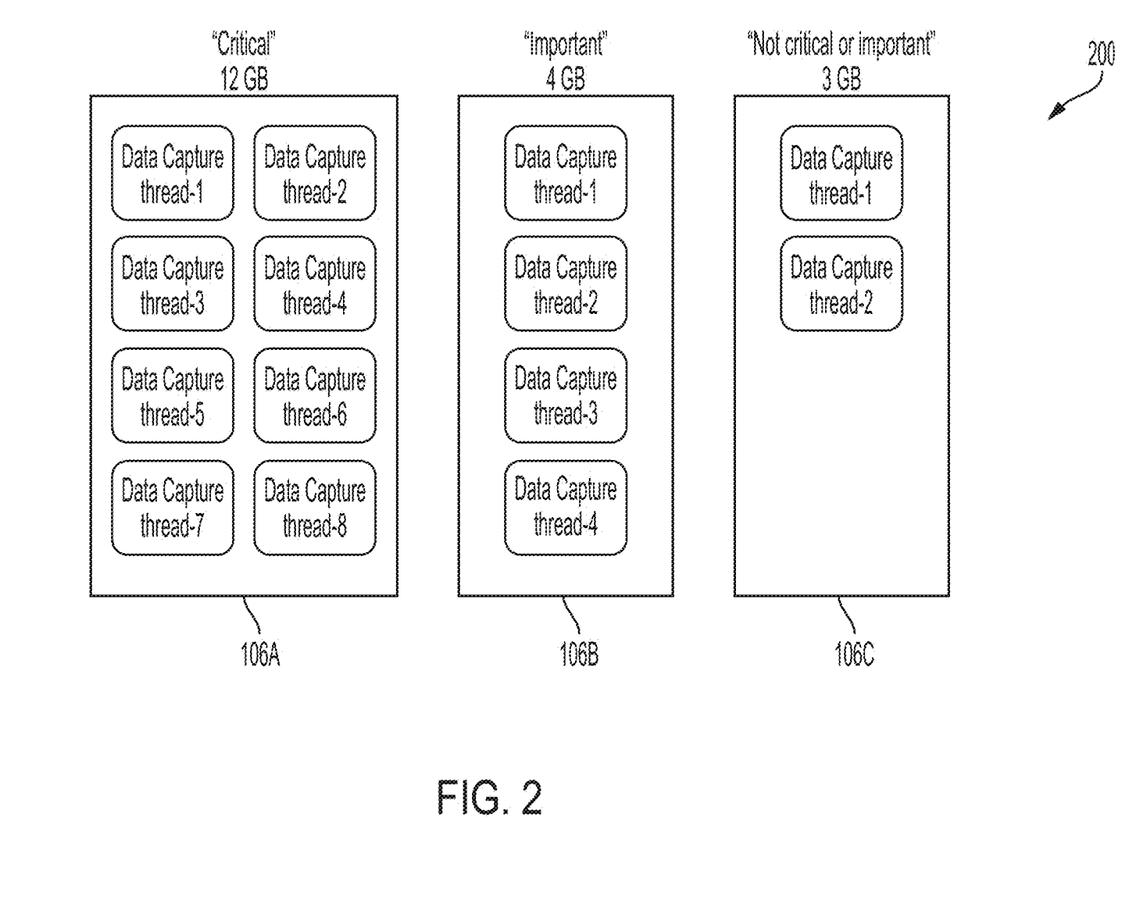
FIG. 2 depicts a high level block diagram of addresses spaces in accordance with one or more embodiments of the present invention.

Turning now to FIG. 2, a high level block diagram 200 of three address spaces that are to be included in a memory dump is generally shown in accordance with one or more embodiments of the present invention. In accordance with one or more embodiments of the present invention, the address spaces to include in the memory dump are selected by diagnostic data program 110 of FIG. 1 based on a detected computer error.

In accordance with one or more embodiments of the present invention, a rough size of the memory dump is estimated by adding up the amount of storage in use by all of the address spaces selected for inclusion in the memory dump. The amount of storage in use by each of the address spaces can be retrieved, for example, from the OS. If the estimated size of the memory dump is lower than the real memory currently available on the system, the diagnostic data program 110 will attempt to capture the diagnostic data, or memory dump, using parallelism. The diagnostic data program 110 can determine a parallelism factor (e.g., how many threads to assign) for each address space based on its priority and/or the address space's contribution to the size of the memory dump.

As shown in FIG. 2, address space 106A has a size of twelve GBs, address space 106B has a size of four GBs, and address space 106C has a size of three GBs. Thus, the estimated size of the total memory dump is nineteen GB. A check is made by the diagnostic data program 110 to ensure that at least nineteen GBs of real memory or central storage are available for capturing the memory dump. In accordance with one or more embodiments of the present invention, the diagnostic data program 110 also checks to ensure that enough CPU resources (e.g., threads) are available to perform the memory dump process in parallel within one or more of the addresses spaces.

Based on determining that sufficient resources (e.g., memory and CPU) for parallelism are available, the diagnostic data program 110 determines the priority levels of the address spaces. The priority of the address spaces can be retrieved, for example from a workload manager (e.g., an OS). In accordance with one or more embodiments of the present invention, three priority levels in order of decreasing importance/priority are defined: critical, important, and the rest (not critical or important). Those skilled in the art will recognize that any number of priority levels can be implemented by embodiments of the present invention.

In accordance with one or more embodiment of the present invention, the parallelism factor for each of the address spaces is based on the workload importance, or priority level. For example, a maximum number of parallel processes (e.g., eight) will be targeted to capture data in critical address spaces, while an intermediate number of parallel processes (e.g., four) will be used in important spaces, and a lower number of parallel processes (e.g., two) will be used in the rest of address spaces.

In this example, the threshold number of resources includes nineteen GBs of real memory and fourteen threads, or processes.

As shown in FIG. 2, address space 106A has a priority level of "critical," address space 106B has a priority level of "important," and address space 106C has a priority level of "not critical or important." The diagnostic data program 110 gives address space 106A eight data capture threads because it has the highest priority level, address space 106B four data capture threads because it has the next highest priority, and address space 106C two data capture threads because it has the lowest priority level. In the example shown in FIG. 2, fourteen threads are distributed among the three address spaces 106A 106B 106C. Those skilled in the art will recognize that different numbers of threads may be assigned to address spaces based for example, on priority level and thread availability.

In accordance with one or more embodiments of the present invention, both the priority and contribution to the dump size can be used by the diagnostic data program 110 to determine the number of threads to assign to each address space if two address spaces selected for debug data capture have the same importance, or priority level. For example, in one or more embodiments, if address space A and B are of same importance, say "important", but B contributes to more than half of the rough size of the overall memory dump, then the maximum number of processes (e.g., 8 in the example above) will be scheduled in address space B while 4 data capture processes will be scheduled in address space A.

In accordance with one or more embodiments of the present invention, the diagnostic data program 110 is responsible for obtaining a buffer based on the address space's importance and for dividing it equally among its processes, or threads. Each process, or thread, will capture data in its dedicated section of the address space and store the captured data into its portion of the buffer. The diagnostic data program 110 will also keep tabs on each of the parallel capture processes and ensure that the tasks complete. In accordance with one or more embodiments of the present invention, fault tolerance processing is updated to retry capture of its allotted data if a process has encountered an error, in order to ensure that the diagnostic debug data isn't compromised.

To take advantage of the parallelism features of one or more embodiments, users (e.g., system programmers) simply need to ensure that ample resources (e.g., a threshold level/number of real storage, CPUs, etc.) are available on the system, and can leave the complicated calculations and setup to the diagnostic data program 110.

Embodiments of the present invention provide customized parallelism as the parallelism factor is determined dynamically for each address space selected for inclusion in the memory dump. In addition, embodiments of the present invention provide improved availability as tasks (e.g., application programs or middleware) in address spaces that are deemed critical or important will be in a non-dispatchable state for a shorter duration, thus improving their availability.

Figure 3:
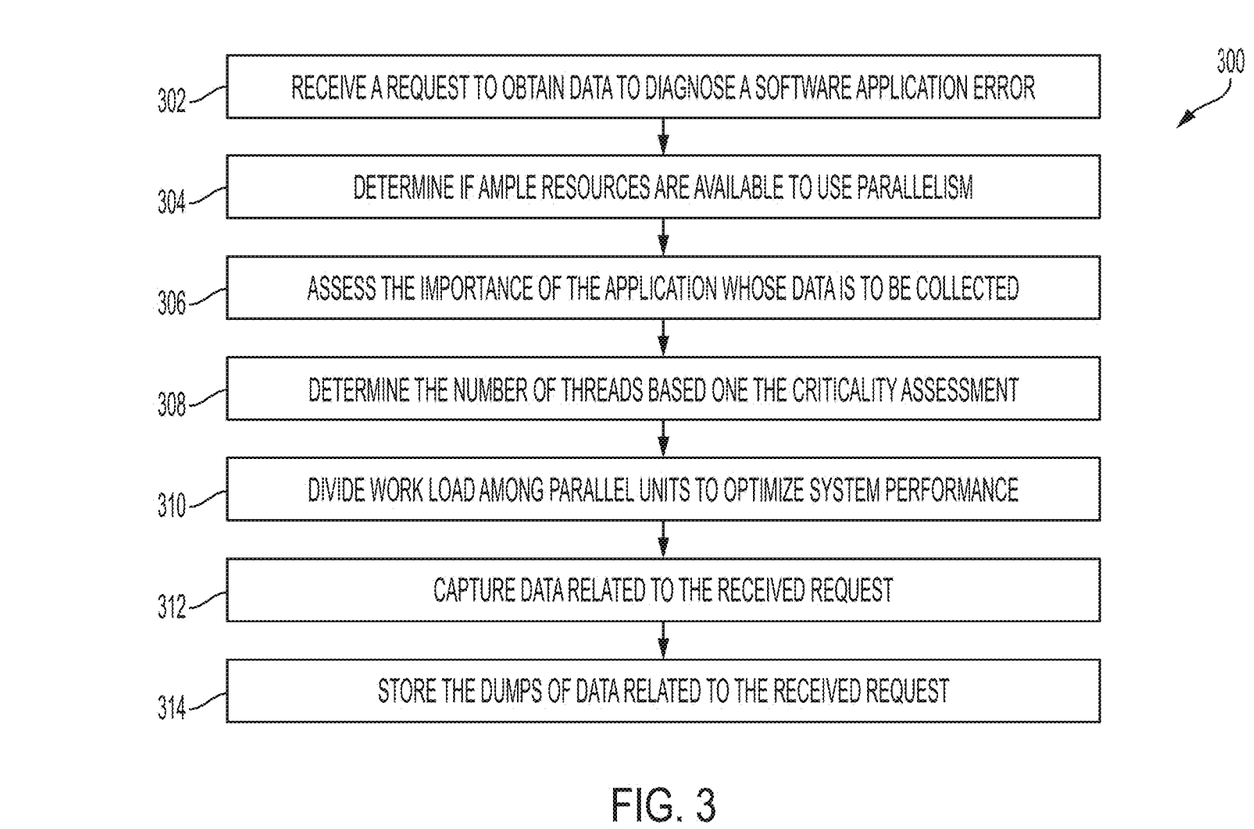
FIG. 3 depicts a flow diagram of a process for prioritizing and parallelizing the capture of data for debugging software applications in accordance with one or more embodiments of the present invention.

Turning now to FIG. 3, a flow diagram of a process 300 for prioritizing and parallelizing the capture of data for debugging computer programs is generally shown in accordance with one or more embodiments of the present invention. The processing shown in FIG. 3 can be used to reduce memory dump capture time and to improve application availability. The processing shown in FIG. 3 can be performed, for example, by diagnostic data program 110 of FIG. 1. At block 302, a request to obtain data to diagnose a software application error is received, and at block 304 it is determined if ample (e.g., a threshold number) of resources (e.g., memory and CPU) are available to use parallelism to capture data for debugging the error. In accordance with one or more embodiments of the present invention, when a memory dump is requested, a rough estimate of the amount of data that will be captured during the memory dump process is computed based on the address spaces requested for inclusion in the memory dump. If the amount of data needed to be captured is less than the number of available real storage frames and enough CPU resources are available, then the diagnostic data program 110 will prepare for parallelism in the capturing of the data.

At block 306, the importance of each address space selected for inclusion in the memory dump is assessed. In accordance with one or more embodiments of the present invention the importance, or priority level, is determined based on information retrieved from the OS. At block 308, the number of threads, or processes, to be assigned to each of the address spaces is determined based at least in part on the criticality assessments in block 306. The number of threads assigned to each address space can be referred to as the parallelism factor of the address space. In accordance with one or more embodiments of the present invention, the highest number threads (e.g., eight) can be assigned to critical address spaces, an intermediate number of threads (e.g., four) can be assigned to important address spaces, and a lower number of threads (e.g., two) can be assigned to the rest of the address spaces. In these one or more embodiments there will always be more than one processes capturing data in any given address space. This will allow the data capture in critical address spaces to complete sooner than those in lower priority address spaces. In addition, when multiple threads are used in all of the address spaces, the data capture in event the lowest priority address spaces is completed faster than contemporary methods that use one thread per address space.

The number of threads assigned to each address space can be determined based on the address space's contribution to the estimated size of the memory dump for all of the address spaces. The address space's contribution can be used to determine the number of threads instead of or in addition to the priority level. For example, if an address space is contributing more than half of the rough estimate of the memory dump size, the maximum number of threads (e.g., eight) can be assigned regardless of its importance. An intermediate number of threads (e.g., four) can be used if an address space is adding more than quarter but less than half to the rough estimate of the memory dump size, and the rest of the address spaces can be assigned a lower number of threads (e.g., two) for the data capture.

At block 310, for each address space, a storage buffer in a sixty-four bit private area, owned by the diagnostic data program 110 is obtained to store captured data. Using a storage buffer is more efficient than using dataspaces to store capture data due to the inherent limitations on the size and number of data spaces used by the diagnostic data program 110. Portions of each of the buffers assigned to an address space can be divided equally among the threads of the address space. In each address space, the storage to be captured is divided up as evenly as possible among the threads assigned to that address space.

At block 310, the workload in each address space is divided up into a number of parallel units. In accordance with one or more embodiments of the present invention, the diagnostic data program 110 creates a list of starting and ending addresses of storage to be captured and deals these entries out to the parallel threads. The diagnostic data program 110 attempts to distribute work evenly among the parallel units, making sure that the entries in the list cover storage areas that are comparably similar in size. Therefore, an entry spanning a wide area of storage may be spilt further, if necessary.

At block 312, in each of the address spaces, the parallel units of the workload are executed by the assigned threads to perform data capture to the designated buffer spaces. In accordance with one or more embodiments of the present invention, the threads within each address spaces are executed in parallel (e.g., at least a portion of the execution of two or more threads overlaps in time).

At block 314, after all of the data capture processes have completed, the dumps of data related to the received request are stored. This can include writing out storage buffers assigned to each thread in every address space selected for inclusion in the memory dump. After the data has been written (e.g., to a dump dataset), the buffers are freed.

In accordance with one or more embodiments of the present invention, non-critical high virtual common storage capture will be initiated in parallel with the address space data capture. In these one or more embodiments, multiple processes will capture requested data all in parallel which will result in further reduced total memory dump capture times.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
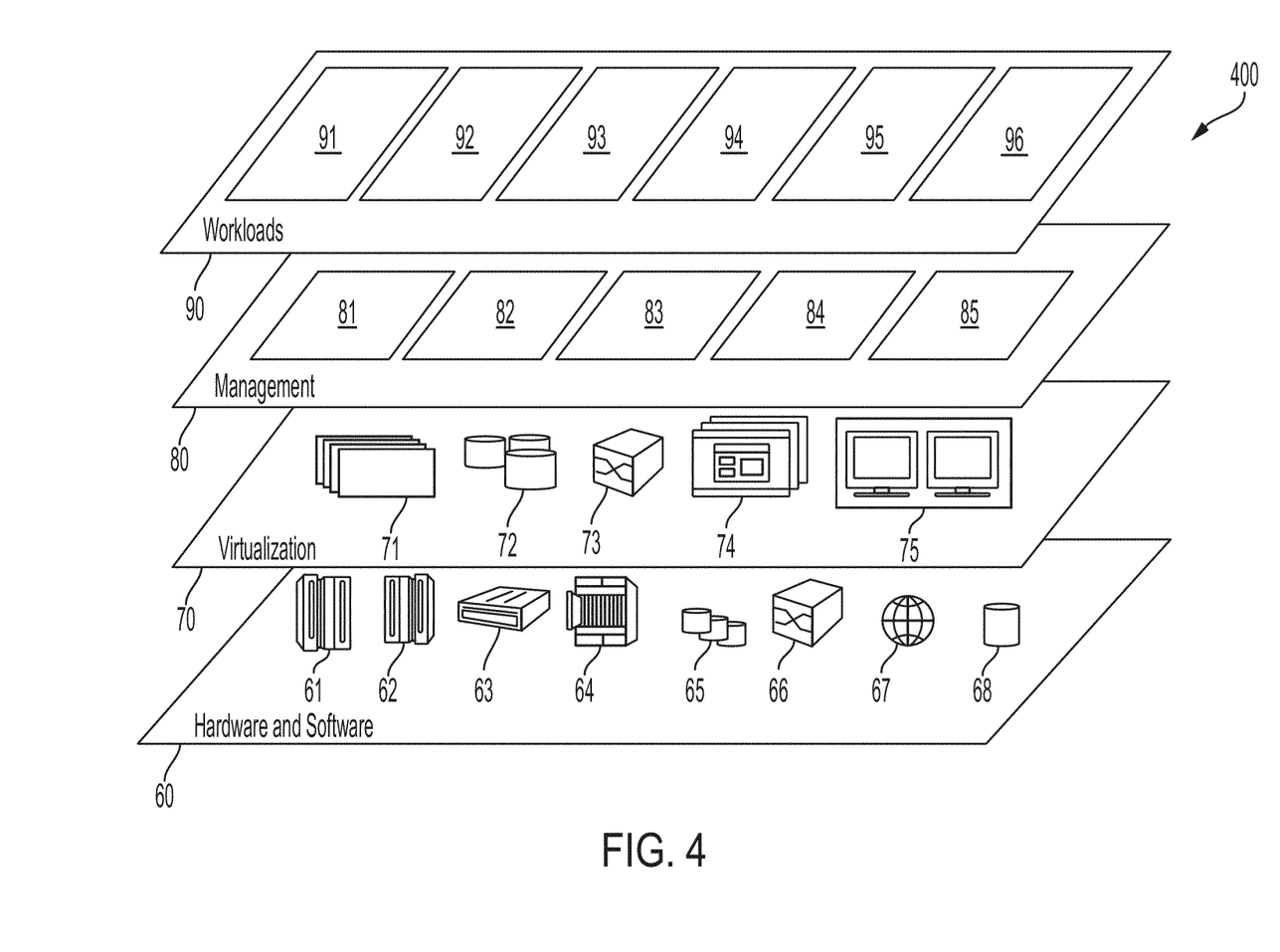
FIG. 4 depicts a cloud computing environment according to one or more embodiments of the present invention.

Referring now to FIG. 4, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
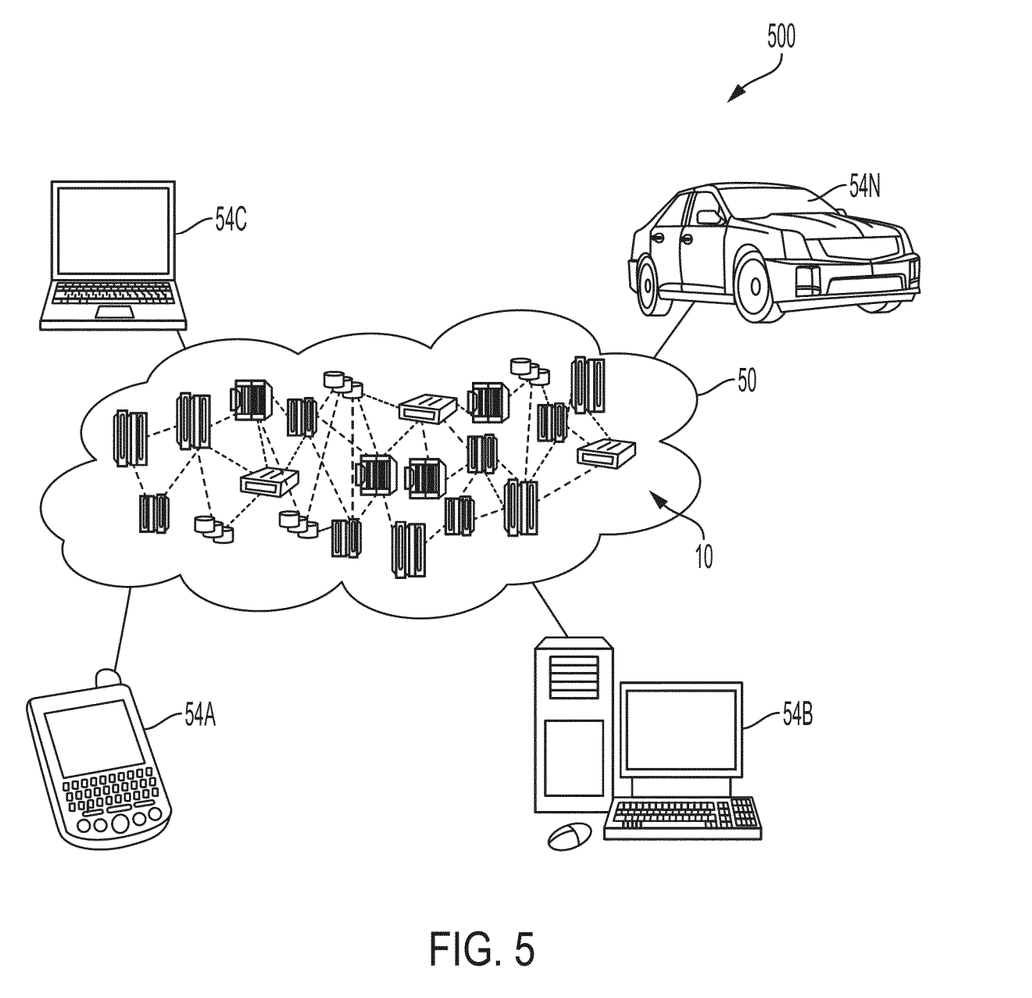
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software debugging 96.

Figure 6:
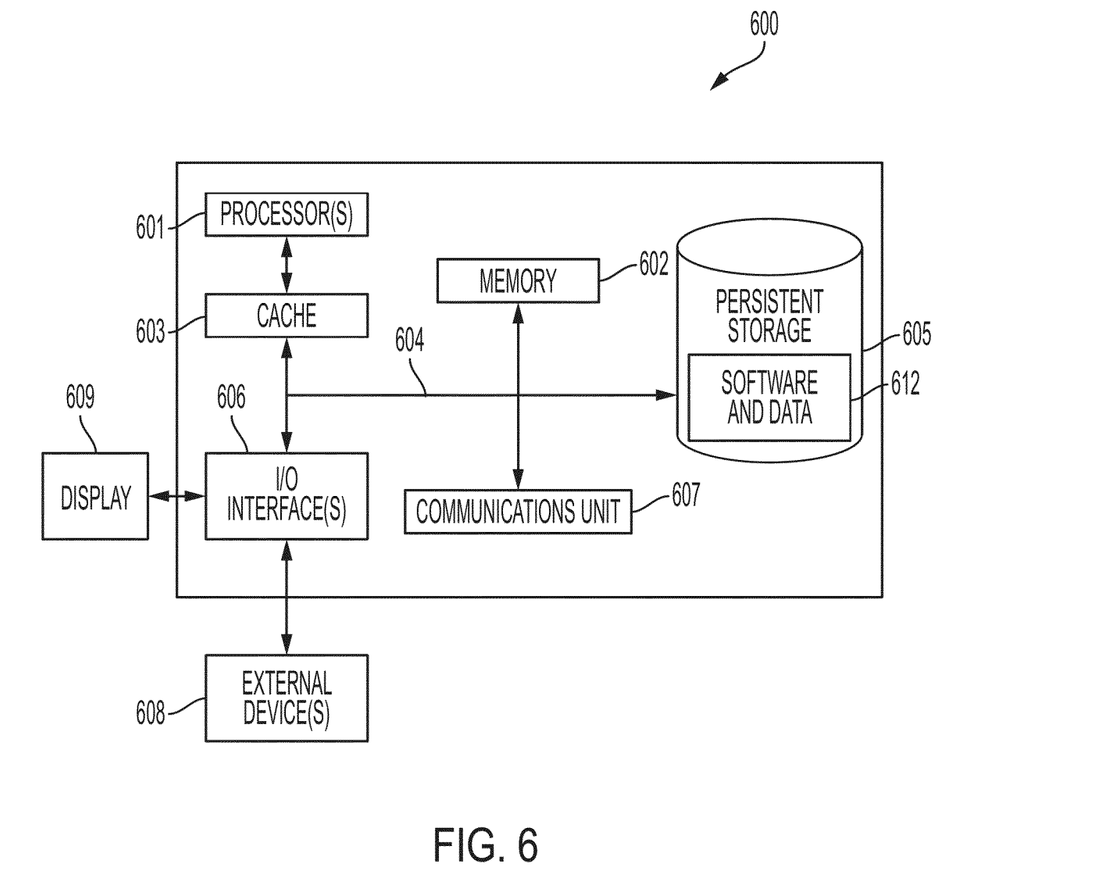
FIG. 6 depicts a processing system for implementing one or more embodiments of the present invention.

It is understood that one or more embodiments of the present invention are capable of being implemented in conjunction with any other type of computing environment now known or later developed. For example, FIG. 6 depicts a block diagram of a computer system 600 for implementing the techniques described herein. In accordance with one or more embodiments of the present invention, system 600 is an example of a cloud computing node 10 of FIG. 4. In accordance with one or more embodiments of the present invention, system 600 is an example of the system 101 and/or the device 103 of FIG. 1. Computer system 600 is an example of a system that includes software and data 612. Computer system 600 includes processor(s) 601, memory 602, cache 603, persistent storage 605, communications unit 607, input/output (I/O) interface(s) 606, and communications fabric 604. Communications fabric 604 provides communications between memory 602, cache 603, persistent storage 605, communications unit 607, and I/O interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, with respect to system 101, address spaces 106 are included in a portion of memory 602. In an embodiment, with respect to system 101, a portion of storage 103 is included within persistent storage 605. In some embodiments, with respect to system 101, an instance of memory dump 107 is included in persistent storage 605. In other embodiments, some instances of memory dump 107 are included in memory 602. With respect to device 130, storage 133 is included within persistent storage 605.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 are stored in persistent storage 605 for access and/or execution by one or more of the respective processor(s) 601 via cache 603 and one or more memories of memory 602. With respect to system 101, software and data 612 includes: administrative interface 102, software application 104, log files 105, middleware programs 108, system management functions 109, diagnostic data program 110, and various programs (not shown). In an embodiment, software and data 612 includes an instance of memory dump 107. With respect to device 130, software and data 612 includes: UI 132 and various programs and data (not shown).

Communications unit 607, in these examples, provides for communications with other data processing systems or devices, including resources of system 101 and device 130. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Software and data 612 used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor. Display 609 can also function as a touch screen, such as the display of a tablet computer or a smartphone.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a request to obtain data to diagnose a computer error, the data located in an address space assigned to a computer program;
   estimating a size of the data;
   determining whether a threshold number of resources are available to obtain the data, the threshold number based at least in part on the estimated size of the data; and
   based on determining that the threshold number of resources are available to obtain the data:
      assessing a priority level of the computer program;
      determining a number of threads to assign to a workload to obtain the data from the address space, the number of threads based at least in part on the priority level of the computer program;
      assigning the determined number of threads to the workload;
      dividing the workload into a number of parallel units, the number of parallel units equal to the number of threads assigned to the workload;
      executing, by the assigned threads, the parallel units of the workload to capture the data in the address space; and
      storing the captured data,
   wherein at least a portion of the data is located in a second address space of the computer and the determining is further based at least in part on a percentage of the data that is located in the second address space of the computer.

2. The computer-implemented method of claim 1, wherein the executing of two or more of the parallel units of the workload overlaps in time.

3. The computer-implemented method of claim 1, wherein the determining the number of threads to assign to a workload for obtaining the data is further based at least in part on the size of the data.

4. The computer-implemented method of claim 1, wherein the second address space is assigned more threads than the address space based at least in part on the address space and the second address space having the same priority level, and on the second address space having a greater percentage of the data than the address space.

5. The computer-implemented method of claim 1, wherein the address space is assigned more threads than a second address space assigned to a second computer program having a lower priority level than the address space.

6. The computer-implemented method of claim 1, wherein the computer program is an application program.

7. The computer-implemented method of claim 1, wherein the computer program is middleware.

8. A system comprising:
a memory having computer readable instructions; and
one or more processors for executing the computer readable instructions, the computer readable instructions controlling the one or more processors to perform operations comprising:
receiving a request to obtain data to diagnose a computer error, the data located in an address space assigned to a computer program;
estimating a size of the data;
determining whether a threshold number of resources are available to obtain the data, the threshold number based at least in part on the estimated size of the data; and
based on determining that the threshold number of resources are available to obtain the data:
assessing a priority level of the computer program;
determining a number of threads to assign to a workload to obtain the data from the address space, the number of threads based at least in part on the priority level of the computer program;
assigning the determined number of threads to the workload;
dividing the workload into a number of parallel units, the number of parallel units equal to the number of threads assigned to the workload;
executing, by the assigned threads, the parallel units of the workload to capture the data in the address space; and
storing the captured data,
wherein at least a portion of the data is located in a second address space of the computer and the determining is further based at least in part on a percentage of the data that is located in the second address space of the computer.

9. The system of claim 8, wherein the executing of two or more of the parallel units of the workload overlaps in time.

10. The system of claim 8, wherein the determining the number of threads to assign to a workload for obtaining the data is further based at least in part on the size of the data.

11. The system of claim 8, wherein the second address space is assigned more threads than the address space based at least in part on the address space and the second address space having the same priority level, and on the second address space having a greater percentage of the data than the address space.

12. The system of claim 8, wherein the address space is assigned more threads than a second address space assigned to a second computer program having a lower priority level than the address space.

13. The system of claim 8, wherein the computer program is an application program.

14. The system of claim 8, wherein the computer program is middleware.

15. A computer program product comprising a computer readable storage medium having program instructions embodied therewith, the program instructions executable by a processor to cause the processor to perform operations comprising:
receiving a request to obtain data to diagnose a computer error, the data located in an address space assigned to a computer program;
estimating a size of the data;
determining whether a threshold number of resources are available to obtain the data, the threshold number based at least in part on the estimated size of the data; and
based on determining that the threshold number of resources are available to obtain the data:
assessing a priority level of the computer program;
determining a number of threads to assign to a workload to obtain the data from the address space, the number of threads based at least in part on the priority level of the computer program;
assigning the determined number of threads to the workload;
dividing the workload into a number of parallel units, the number of parallel units equal to the number of threads assigned to the workload;
executing, by the assigned threads, the parallel units of the workload to capture the data in the address space; and
storing the captured data,
wherein at least a portion of the data is located in a second address space of the computer and the determining is further based at least in part on a percentage of the data that is located in the second address space of the computer.

16. The computer program product of claim 15, wherein the executing of two or more of the parallel units of the workload overlaps in time.

17. The computer program product of claim 15, wherein the determining the number of threads to assign to a workload for obtaining the data is further based at least in part on the size of the data.

* * * * *